Inventors
CHARLES H. COLEMAN, JR.
MICHAEL O. FELIX &
PETER W. JENSEN
By Robert H. Clay
Atty's Sept. 5, 1967 C. H. COLEMAN, JR., ET AL 3,340,367

PLAYBACK EQUALIZATION SCHEME FOR A REPRODUCED FREQUENCY MODULATED SIGNAL

Filed July 24, 1963 2 Sheets-Sheet 2

Inventors
CHARLES H. COLEMAN, JR.
MICHAEL O. FELIX &
PETER W. JENSEN

By Robert H. Clay
Atty's

United States Patent Office 3,340,367

Patented Sept. 5, 1967

3,340,367

PLAYBACK EQUALIZATION SCHEME FOR A REPRODUCED FREQUENCY MODULATED SIGNAL

Charles H. Coleman, Jr., Belmont, Michael O. Felix, San Carlos, and Peter W. Jensen, Fremont, Calif., assignors to Ampex Corporation, Redwood City, Calif., a corporation of California Filed July 24, 1963, Ser. No. 297,425
8 Claims. (Cl. 179—100.2)

The present invention relates to magnetic tape reproducers and more particularly to a method and a circuit for providing equalization in frequency and phase response of a playback signal in a magnetic tape reproducer.

Broad band signals, such as television signals, ordinarily cannot be recorded directly on magnetic tape. To record the broad band signals, a frequency modulation system has been employed, that is, a high frequency carrier signal is frequency modulated by the signal to be recorded, and the frequency modulated signal is recorded. In the conventional system, a low deviation ratio is employed, that is, the maximum frequency deviation is made smaller than the maximum modulating frequency. In this way, the frequency modulated signal is effectively composed of the carrier frequency, one lower side band and one upper side band. The upper and lower side band limits are separated from the carrier by the modulating frequency. Because of the head-tape-head characteristic of the recording/reproducing process, the upper side band components of the reproduced frequency modulated signal are non-linearly attenuated, while the lower side band components are emphasized, that is, the side band components of the reproduced signal above the carrier frequency are smaller in amplitude than the lower side band components.

Attempts have been made to shape the response of the reproducer circuit empirically by employing head resonance and resonant circuits. However, the reproduced signal has suffered from differential phase and gain distortion, uneven frequency response, poor transient response, etc.

An object of the present invention is the provision of a method and a means for compensating for non-linear amplitude vs. frequency characteristic introduced in a reproduced signal by a tape-to-head process in a magnetic tape recorder/reproducer. Another object of the invention is the provision of an equalization method and circuit for a magnetic tape reproducer in which the signal has been recorded by frequency modulation techniques. A further object is the provision of an improved equalization circuit and method for a magnetic tape reproducer which provides an optimum signal-to-noise ratio.

Other objects and advantages of the present invention will become apparent by reference to the following description and accompanying drawings.

Figure 3:
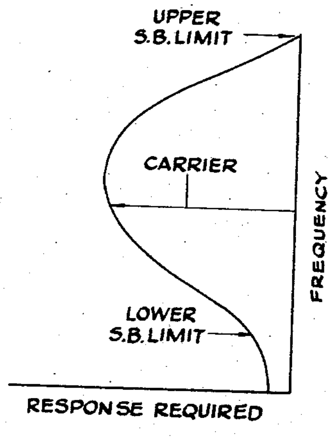
FIGURE 3 is a graph showing the equalization curve required to convert the curve of FIGURE 1 to that of FIGURE 2.

The equalization circuit shown in the drawings is particularly adapted to be employed in a reproducer circuit having a playback head which has been completely compensated, that is, amplitude and phase distortion introduced in the reproduced frequency modulated signal by having the playback head resonance occur within the signal bandpass, has been compensated. The equalization circuit converts the response of the reproducer circuit to a straight line response with a constant envelope delay characteristic (i.e., the delay does not vary with frequency). The straight line response is at a maximum at a value equal to the carrier frequency less the highest modulating frequency and reaches a value of zero at a frequency equal to the carrier signal plus the highest modulating frequency of the signal. Briefly, the equalization circuit includes means for providing linear phase high frequency emphasis and a low pass filter which are selected so as to provide the necessary response curve to convert the normal response of the reproducer circuit to the desired straight line response.

Figure 1:
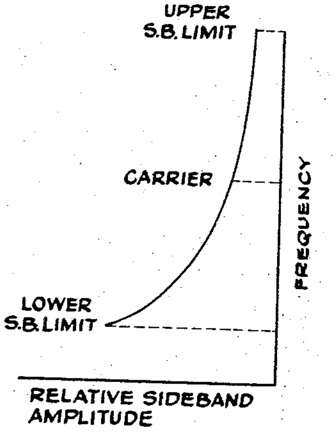
FIGURE 1 is a graph showing the playback response of a conventional television tape recorder/reproducer in which the head resonance has been compensated.

For purposes of explanation, the equalization circuit is explained hereinafter as incorporated in the reproducer circuit of a conventional television reproducer. The normal playback response of a television tape reproducer circuit whose record current characterstic is flat with frequency and whose playback head resonance has been completely compensated is shown in FIGURE 1 for a given carrier frequency. For relatively small excursions of the carrier frequency, such as are typical for the range of luminance levels of a TV signal, the curve remains essentially the same. As can be seen from the curve, the lower side band components are much higher in amplitude than the upper side band components of the reproduced frequency modulated signal. The amplitude of the side band components is highest at the lower side band limit (i.e., a frequency equal to the carrier frequency minus the highest modulating frequency) and decreases non-linearly until the upper side band limit is reached. Side band components lying along this curve are also subject to a substantially constant delay by the tape-head process.

Figure 2:
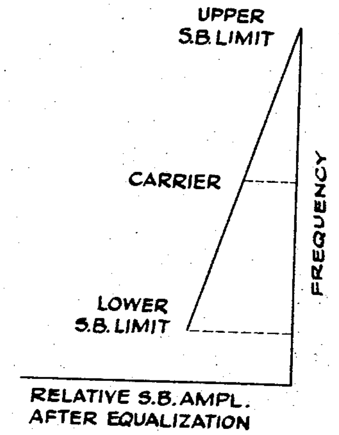
FIGURE 2 is a graph showing the desired playback response of the television tape recorder/reproducer.

In order to eliminate differential effects, such as the frequency response being a function of the carrier frequency, and to provide a flat demodulation frequency response, the response of the reproducer circuit is preferably converted to the straight line shown in FIGURE 2. Minimum transient distortion and minimum differential phase distortion require that the equalized reproducer circuit have a constant envelope delay characteristic.

Since noise components are approximately equal on both side bands while the signal components are larger in amplitude in the lower side band components, for optimum demodulated signal-to-noise ratio, the straight line response is preferably tilted so that it reaches zero at the upper side band limit. Thus, for high modulation frequencies, the lower side band is the principal contributor to the output signal.

To convert the curve of FIGURE 1 to that of FIGURE 2, the equalization circuit is designed to have an equalization curve similar to that shown in FIGURE 3. As can be seen from FIGURE 3, the equalization curve is relatively low at the lower side band limit and increases non-linearly to a maximum value slightly above the carrier frequency and then decreases to zero at the upper side band limit.

Figure 4:
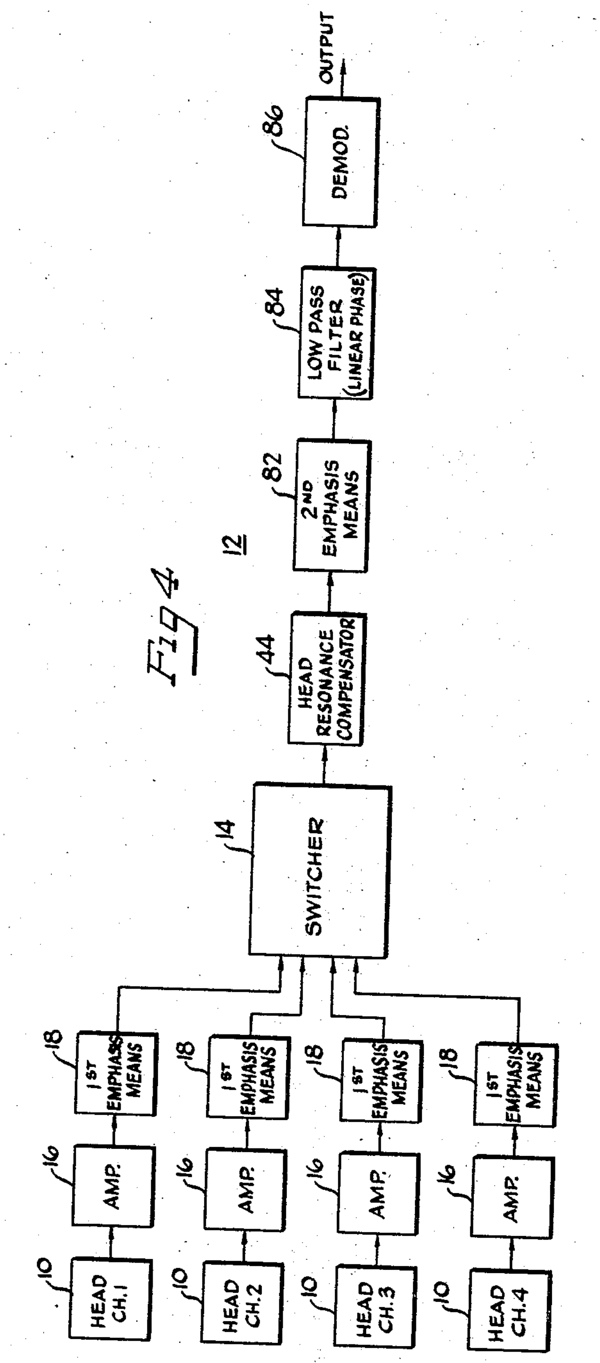
FIGURE 4 is a block diagram of a reproducer circuit which includes a circuit for providing the equalization curve of FIGURE 3.

The block diagram shown in FIGURE 4 shows a reproducer circuit having the equalization circuit therein, which may be employed in a conventional four-head television tape recorder/reproducer (not shown). In such a recorder a longitudinally moving two inch magnetic tape is cupped about a rotating drum which rotates about an axis extending parallel to the path of movement of the tape. The drum carries four equally spaced heads 10 at its periphery which contact the tape and trace transverse tracks successively along the tape.

During playback, the heads 10 are sequentially connected to a common output circuit 12 by a switcher 14 which may be of the conventional type. Each of the heads 10 is connected through one or more voltage amplifiers 16, which may be of the conventional type, and through a first means 18 for providing linear phase high frequency emphasis to one of the input terminals of the switcher 14.

Figure 5:
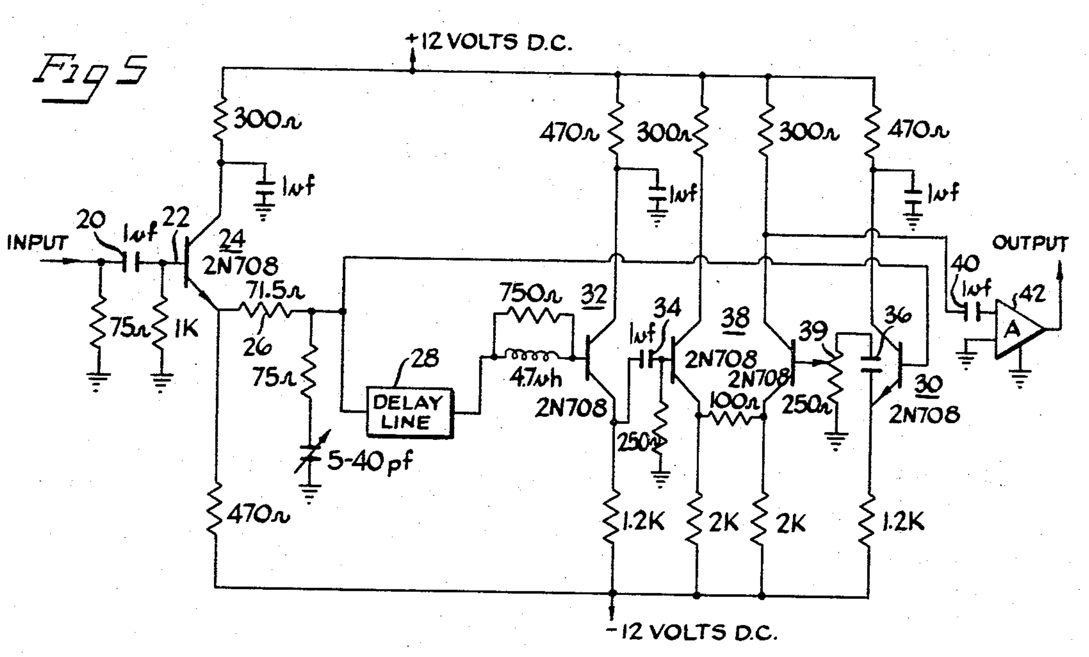
FIGURE 5 is a schematic diagram of a circuit which may be employed in two of the blocks of FIGURE 4.

The first emphasis means 18 may include the circuit shown in FIGURE 5, which is similar to a conventional aperture corrector employed in television circuits. As shown in FIGURE 5, the output signal from the amplifiers 16 is coupled through a coupling capacitor 20 to the base 22 of a transistor 24 in a common collector configuration, sometimes called an emitter follower. The output signal from the emitter follower 24 is coupled through a series resistor 26 to the sending end of an open ended delay line 28 which may be a distributed constant or a conventional artificial transmission line composed of inductors and capacitors. The sending end of the delay line 28 is also coupled to the input of an amplifier 30 which, as shown, is a transistor in a common collector configuration.

The receiving end of the delay line 28 is coupled to an amplifier 32 which, as shown, is a transistor in a common collector configuration. The voltage at the receiving end of the delay line remains substantially constant with frequency, while the voltage at the sending end varies co-sinusoidally with frequency because of the reflected signal. At the frequency where the delay line is equal to a half wave, the voltages at the sending end and the receiving end are in phase.

The sending end voltage is subtracted from the receiving end voltage by coupling outputs of the two amplifiers 30 and 32 through respective coupling capacitors 34 and 36 to the respective inputs of a conventional differential amplifier 38. The amplitude of the sending end voltage applied to the differential amplifier is varied by a potentiometer 39 in the input circuit thereof. In this way the gain at the area of the carrier-frequency remains substantially constant while the maximum and minimum points are increased and decreased respectively.

The output of the differential amplifier is coupled through a capacitor 40 to an output amplifier 42 which may be a pair of transistors in a conventional totem pole configuration. The output of the output amplifier, in turn, is coupled to one of the inputs of the switcher 14, as shown in FIGURE 4.

The emphasis means 18 provides a high-frequency amplitude boost to the output signal with a linear phase characteristic over the entire range of frequencies. The maximum boost is obtained at the frequency where the delay line 28 is equal to a half wave length. This frequency is normally selected to occur at a frequency about equal to twice the carrier frequency. The exact placement of this frequency depends upon the exact shape of the desired equalization curve.

The first emphasis means 18 is located before the switcher so that the off-tape response of the individual heads may be matched to each other.

Figure 6:
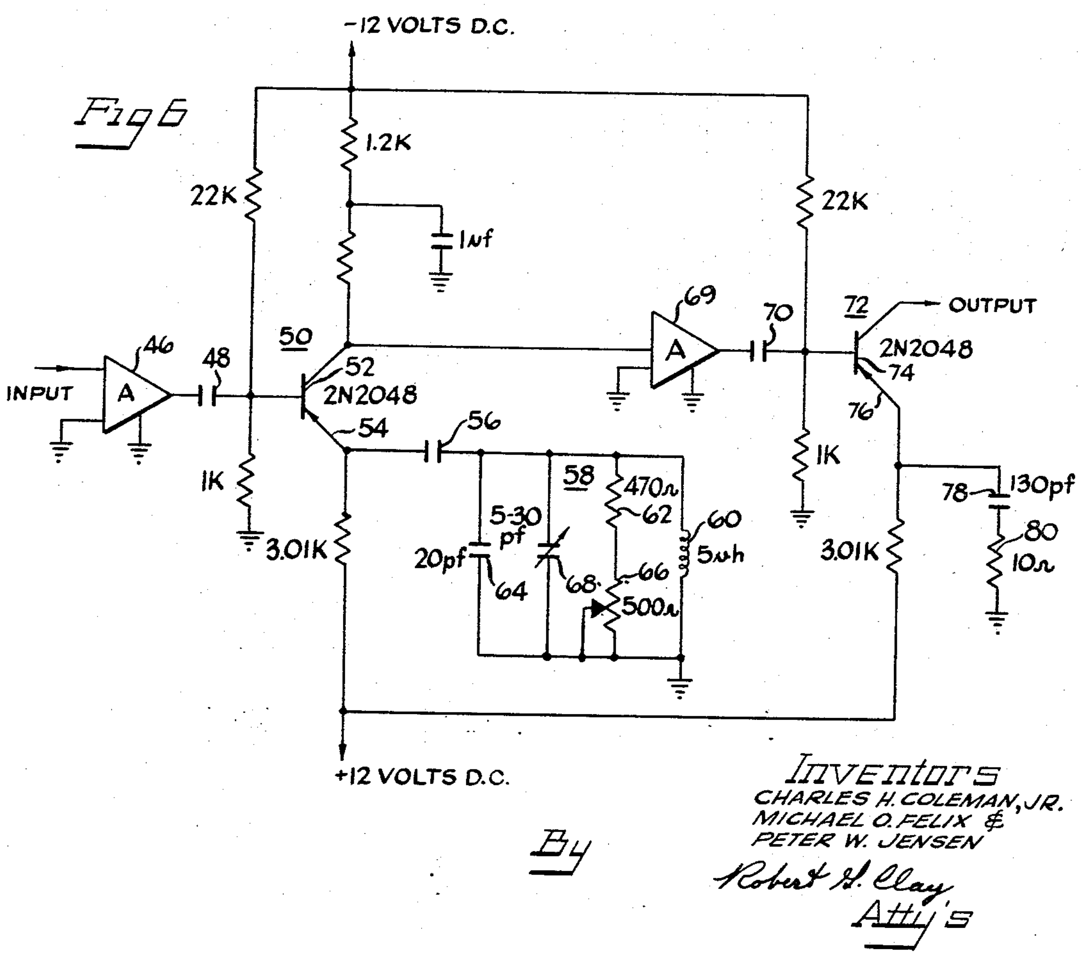
FIGURE 6 is a schematic diagram of a circuit which may be employed for another of the blocks shown in FIGURE 4.

In the illustrated embodiment, the output of the switcher 14 is coupled to a head resonance compensator 44. A head resonance compensator circuit which may be employed is shown in FIGURE 6. This circuit is described fully in a copending application, Ser. No. 305,740, filed Aug. 30, 1963.

The compensator circuit shown in FIGURE 6 is designed to compensate for phase and amplitude distortion caused by resonance of the inductance of the magnetic transducer heads 10 with the input capacity of the amplifier 16. Only one compensator circuit is required in the reproducer circuit, since the four heads are matched to have the same resonant frequency and the same quality factor (Q). The input signal is applied to the input of an amplifying circuit 46 which, preferably, includes an emitter follower, and is amplified by the same and is coupled through a coupling capacitor 48 to the input of a first stage 50 which partially compensates for the resonance of the head. The first stage 50 includes a transistor 52 in a common emitter configuration. The emitter 54 of the transistor 52 is connected through a coupling capacitor 56 to a parallel resonance network 58. The other side of the parallel resonance network 58 is connected to ground.

The biasing of the transistor 52 is selected so that the internal base to emitter impedance of the transistor 52 is low compared to the impedance of the resonance network within the range of signal frequencies. In this way, the voltage across the resonance network closely approaches the input voltage to the transistor within the range of signals being reproduced.

As shown in FIGURE 6, the resonance network 58 includes an inductor 60, a resistor 62 and a capacitor 64 connected in parallel between the coupling capacitor 56 and ground. A potentiometer 66 is connected in series with the resistor 62 so that the resistance in the resonance network may be varied. Likewise a variable capacitor 68 is connected across the capacitor 64 so that the capacity of the resonance network may be varied.

The variable capacitor 68 in the resonance network 58 is adjusted until the resonant frequency of the resonance network 58 equals the resonant frequency of the head. In this connection, the product of the inductance and capacity of the resonance network 58 is made equal to the product of the head inductance and the input capacity to the amplifier 16. Also at the resonant frequency the quality factor (Q) of the resonance network 58 is made equal to the quality factor (Q) of the head. In this connection the product of the inductance and conductance of the resonance circuit 68 is made equal to the product of the input capacity and resistance of the head 10.

When the resonance circuit 58 is adjusted, as described above, the output signal from the first stage 50 of compensation is inversely proportional (6 db per octave slope) to the frequency of the input signal thereto (assuming a constant amplitude input signal). The output signal is coupled through the amplifier 69 which may be an impedance matching amplifier such as a transistor in a conventional common collector configuration, and through a coupling capacitor 70 to the input of a second stage 72 of compensation. The second stage 72 compensates for the decreasing amplitude of the output signal from the first stage with frequency (assuming a constant amplitude input signal to the first stage).

As shown in FIGURE 6, the second stage 72 includes a transistor 74 in a common emitter configuration. The emitter 76 of the transistor is connected to ground through a series capacitor 78 and resistor 80.

The transistor 74 is biased in a similar manner to the first stage 50 of compensation. In this connection, the second stage transistor 72 is biased so that the voltage across the capacitor 78 in the emitter circuit nearly equals the input voltage within the range of reproduced signal frequencies. In this connection, the reactance of the capacitor 78 is made large compared to the base-emitter impedance of the transistor 74. Also to provide the increase in output signal with frequency, the reactance of the emitter capacitor 78 at signal frequencies is made much less than the resistance of the emitter circuit. In this way the output signal from the second stage 72 for a constant amplitude input signal increases in amplitude in direct proportion to the frequency of the input signal (6 db per octave slope). Since the signal from the first stage 50 decreases in amplitude with frequency, the resulting output signal of the second stage 72 is a signal which is constant with change of frequency (assuming constant amplitude input signal).

To provide additional high frequency emphasis, the output from the resonance compensating means 44 is coupled to the input of a second means 82 for providing high frequency emphasis with a linear phase characteristic over the entire range of frequencies. The second emphasis means may be similar to the first emphasis means 18, previously described. The output of the second emphasis means 82 is fed to a phase corrected (i.e., linear phase) low pass filter 84 which may be of the conventional type such as that described in BBC Engineering Division Monograph No. 17, April 1958. The design of the filter depends upon the shape of the particular playback response curve after it has been compensated for head resonance. The filter is designed to have a bandwidth in which the half power point occurs slightly above the carrier frequency and the first null occurs at the upper side band limit.

As shown in FIGURE 4, the output of the low pass filter 84 is coupled to a demodulator 86 which may be of the conventional type used in a television tape recorder.

The equalization circuit shown in FIGURE 4 provides a straight line amplitude response having a constant envelope delay. The straight line response reaches zero at a frequency equal to the carrier plus the highest modulating frequency and thereby provides an optimum signal-to-noise ratio.

In one embodiment of the reproducer circuit which is employed in a television tape recorder/reproducer, a signal is reproduced which has 8.5 mc. carrier component, a 3.0 mc. lower side band limit, and a 14.0 mc. upper side band limit. The first and second emphasis means each has a delay line which is a ½ wavelength at 16.0 megacycles and a gain of about 3 at this frequency relative to the lower side band limit frequency. The low pass filter has a transmission band from D.C. to 10.5 mc. (−3 db) and a null at 14.0 mc.

It should be realized that the above described equalization circuit may be employed with any FM-type recorder/reproducer. Also, the arrangement of circuit elements shown in FIGURE 4 may be varied. For example, head resonance compensating means may be provided for each of the heads instead of a single compensating means being provided. In such an application, the head resonance compensating means would be connected in the individual head circuits. Also a separate low pass filter and a second emphasis means may be provided for each of the heads and be connected in the circuit prior to the switcher. Also, in certain applications, a single emphasis means may be provided.

Various other changes and modifications may be made in the above described equalization circuit without deviating from the spirit or scope of the present invention.

Various features of the present invention are set forth in the accompanying claims.

What is claimed is:

1. An equalization circuit for a transducer head employed for reproducing a recorded frequency modulated signal, which signal had been produced by frequency modulating a carrier frequency with a broad band signal using a low deviation ratio, phase and amplitude distortion caused by resonance of said head being compensated, said circuit comprising means coupled to said head for providing a high frequency amplitude boost to the reproduced signal with a linear phase characteristic, and a phase corrected low pass filter means coupled to the output of said means, the combined response of said high frequency boosting means and said filter means being such that the signal output of said equalization circuit during reproducing decreases linearly with increasing frequency from the first lower side band component of the highest modulating frequency of the frequency modulated signal to the first upper side band component of the highest modulating frequency of the frequency modulated signal.

2. An apparatus for equalizing the frequency response of a frequency modulated signal reproduced from a magnetic medium by a head, phase and amplitude distortion caused by resonance of said head being compensated, which frequency modulated signal has been produced by frequency modulating a carrier frequency with a broad band signal using a low deviation ratio, said apparatus comprising reproducer means coupled to said head, said reproducer means having a frequency response such that the output of said reproducer means during reproducing is a straight line which is maximum at a frequency equal to the carrier frequency less the highest modulating frequency and is zero at a frequency equal to the carrier frequency plus the highest modulating frequency.

3. An equalization circuit for a transducer head employed for reproducing a recorded frequency modulated signal, which signal had been produced by frequency modulating a carrier frequency with a broad band signal using a low deviation ratio, phase and amplitude distortion caused by resonance of said head being compensated, said circuit comprising means coupled to said head for providing a high frequency amplitude boost to the reproduced signal with a linear phase characteristic, said means including a delay line which is a half wave length at a frequency about equal to twice the carrier frequency, and a phase corrected low pass filter means coupled to the output of said means, said filter means completely attenuating the signal at a frequency equal to the carrier frequency plus the maximum modulating frequency and passing the carrier without substantial attenuation, the combined responses of the boosting circuit and the filter means being such that the amplitude of the reproduced output of the equalization circuit is a maximum at a frequency equal to the carrier frequency minus the maximum modulating frequency of the frequency modulated signal and decreases linearly to a frequency equal to the carrier frequency plus the maximum modulating frequency.

4. A method of equalizing the frequency response of a frequency modulated signal reproduced from a magnetic medium by a head, phase and amplitude distortion caused by resonance of said head being compensated, which signal had been produced by frequency modulating a carrier frequency with a broad band signal using a low deviation ratio, said method comprising emphasizing the high frequencies of the reproduced signal without varying the envelope delay characteristic of the signal, and attenuating side bands of the signal above the carrier signal, the signal being completely attenuated at a frequency equal to the carrier frequency plus the maximum modulating frequency, whereby the amplitude of the reproduced signal decreases uniformly with frequency from a frequency equal to the carrier frequency minus the maximum modulating frequency to a frequency equal to the carrier frequency plus the maximum modulating frequency.

5. A reproducer circuit for a transducer head employed for reproducing a recorded frequency modulated signal, which signal had been produced by frequency modulating a carrier frequency with a television signal using a low deviation ratio, comprising first means for compensating for phase and amplitude distortion caused by resonance of said head, second means for providing a high frequency amplitude boost to the reproduced signal with a linear phase characteristic, said head being coupled to the input of one of said means and the input of the other of said means being coupled to the output of said one means, and a phase corrected low pass filter means coupled to the output of said other means, the combined responses of said second means and said filter being such that the amplitude of the reproduced signal decreases linearly from a frequency equal to the carrier frequency minus the maximum frequency of the television signal to a frequency equal to the carrier frequency plus the maximum frequency of the television signal.

6. A method of compensating for phase and amplitude distortion in a frequency modulated signal reproduced from a magnetic medium by a head, which signal had been produced by frequency modulating a carrier frequency with a television signal using a low deviation ratio, said method comprising compensating for phase and amplitude distortion caused by resonance of said head, boosting the high frequency amplitude of the reproduced signal without varying the envelope delay characteristic of the signal, and attenuating the side bands of said signal between the carrier signal and the upper side band limit, the signal being completely attenuated at the upper side band limit, whereby the amplitude of the reproduced signal decreases uniformly with frequency from a frequency equal to the carrier frequency minus the maximum frequency of the television signal to a frequency equal to the carrier frequency plus the maximum frequency of the television signal.

7. In a broad band tape recorder and/or reproducer in which a transducer head reproduces a frequency modulated signal from a magnetic medium, the reproduced signal being effectively composed of side band components disposed between the carrier frequency and the first lower side band component of the maximum modulating frequency and between the carrier frequency and the first upper side band component of the maximum modulating frequency, the maximum modulating frequency being greater than the deviation of the carrier frequency, and the carrier frequency of the reproduced signal being above and adjacent the maximum modulating frequency, said reproducer circuit comprising first and second circuits connected in series with said transducer head, one of said circuits including means for compensating for amplitude increases and phase shifts in the reproduced signal caused by the resonance of the transducer head, and the other of said circuits including means having a linear phase characteristic for equalizing a signal applied to its input, which equalizing means has a frequency response such that the signal amplitude of the output of said reproducer circuit decreases linearly with increasing frequency from a frequency equal to the carrier frequency minus the maximum modulating frequency to a frequency equal to the carrier frequency plus the maximum modulating frequency.

8. A reproducer circuit in accordance with claim 7 in which the frequency response of the equalizing means increases nonlinearly with increasing frequency to a maximum at a frequency just above the carrier frequency, then decreases with increasing frequency to a minimum at a frequency equal to the carrier frequency plus the maximum modulating frequency.

References Cited

Bernstein: "Video Tape Recording," Rider Publishers, Inc., New York, pages 88–89, 1960.

BERNARD KONICK, *Primary Examiner.*

L. G. KURLAND, *Assistant Examiner.*